United States Patent [19]

Hashimoto

[11] Patent Number: 4,605,821

[45] Date of Patent: Aug. 12, 1986

[54] AUTOMATIC TELEPHONE ANSWERING APPARATUS

[75] Inventor: Kazuo Hashimoto, Tokyo, Japan

[73] Assignee: Hashimoto Corporation, Tokyo, Japan

[21] Appl. No.: 545,493

[22] Filed: Oct. 26, 1983

[30] Foreign Application Priority Data

Oct. 29, 1982 [JP] Japan .................................. 57-190300

[51] Int. Cl.⁴ ............................................ H04M 1/64
[52] U.S. Cl. .................... 179/6.13; 179/6.09; 179/6.10; 179/6.03
[58] Field of Search ............ 179/6.11, 6.09, 6.13, 179/6.10, 6.03, 6.06; 360/31, 72.1, 74.1, 12, 74.4; 369/25, 50, 53, 58

[56] References Cited

U.S. PATENT DOCUMENTS

| | | | |
|---|---|---|---|
| 3,935,390 | 1/1976 | Winterhalter | 179/6.14 |
| 3,943,292 | 3/1976 | Takayawa | 179/6.13 |
| 3,967,068 | 6/1976 | Shinohara | 179/6.06 |
| 3,984,869 | 10/1976 | Fujii | 360/72.1 |
| 4,000,518 | 12/1976 | Stearns | 360/74.4 |

*Primary Examiner*—Alan Faber
*Attorney, Agent, or Firm*—Lowe Price Leblanc Becker & Shur

[57] ABSTRACT

An automatic telephone answering apparatus has an outgoing message tape on which a first message as an instruction message for causing a caller to record his voice, a mark and a second message as a response-only message are recorded in the order named. In normal operation, the first message is reproduced and a tape portion corresponding to the second message is fast forwarded so as to search the beginning of the first message. However, when an incoming message tape has reached its end or is damaged, a tape portion corresponding to the first message is fast forwarded and only the second message is reproduced.

9 Claims, 3 Drawing Figures

AUTOMATIC TELEPHONE ANSWERING APPARATUS

BACKGROUND OF THE INVENTION

The present invention relates to an automatic telephone answering apparatus for automatically recording a caller's message in response to a telephone call. More particularly, the present invention relates to an improvement of drive controlling means of an outgoing message tape on which an outgoing message is recorded.

An instruction message (to be referred to as a first message hereinafter) which requests a caller to record his voice is recorded at a beginning of an outgoing message tape whether the tape is an endless tape or a tape having an end.

An outgoing message tape is known wherein a first message is recorded at the beginning of the tape and requests a caller to record his voice, and a response-only message (to be referred to as a second message hereinafter) which only gives information to a caller is recorded after a predetermined blank portion following the first message.

However, in the automatic telephone answering apparatus using the outgoing message tape described above, it takes time to search the beginning of the first message, resulting in inconvenience.

SUMMARY OF THE INVENTION

It is, therefore, a first object of the present invention to provide an automatic telephone answering apparatus wherein a first message requesting a caller to record his voice is reproduced, and subsequently a second message as a response-only message is automatically suppressed while a tape is fast forwarded (in the case of an endless tape) or fast rewound (in the case of a tape having an end) so as to immediately search and recover a beginning of the first message.

It is a second object of the present invention to provide an automatic telephone answering apparatus wherein only the second message is given to the caller without reproduction of the first message upon reception of a telephone call when an incoming message tape has reached its end or the incoming message tape is damaged.

In order to achieve the above objects of the present invention, there is provided an automatic telephone answering apparatus using an outgoing message tape on which a first message, a mark and a second message are recorded in the order named, wherein the outgoing message tape is driven upon reception of a telephone call so as to reproduce only the first message and the second message portion is subsequently fast forwarded in a silent mode so as to search or recover the beginning of the first message when the incoming message tape has not reached its end and is not damaged, and wherein the outgoing message tape is driven upon reception of a telephone call when the incoming message tape has read its end or is damaged so as to reproduce only the second message after the first message portion is fast forwarded in a silent mode and the tape speed then changes to a normal speed upon detection of the mark, and the apparatus is returned to a standby mode.

According to the present invention as described above, the automatic telephone answering apparatus is returned to the standby mode after any one of a plurality of messages recorded on the outgoing message tape is reproduced and the beginning of the tape is recovered. Therefore, when the telephone line is looped upon reception of a telephone call, the required message can be immediately reproduced from the beginning. As a result, the necessary message can be immediately given to the caller, resulting in convenience.

BRIEF DESCRIPTION OF THE DRAWINGS

The drawings consisting of FIGS. 1(A) and 1(B) are circuit diagrams of an automatic telephone answering apparatus according to an embodiment of the present invention.

DETAILED DESCRIPTION OF THE PREFERRED EMBODIMENT

Figure 1:
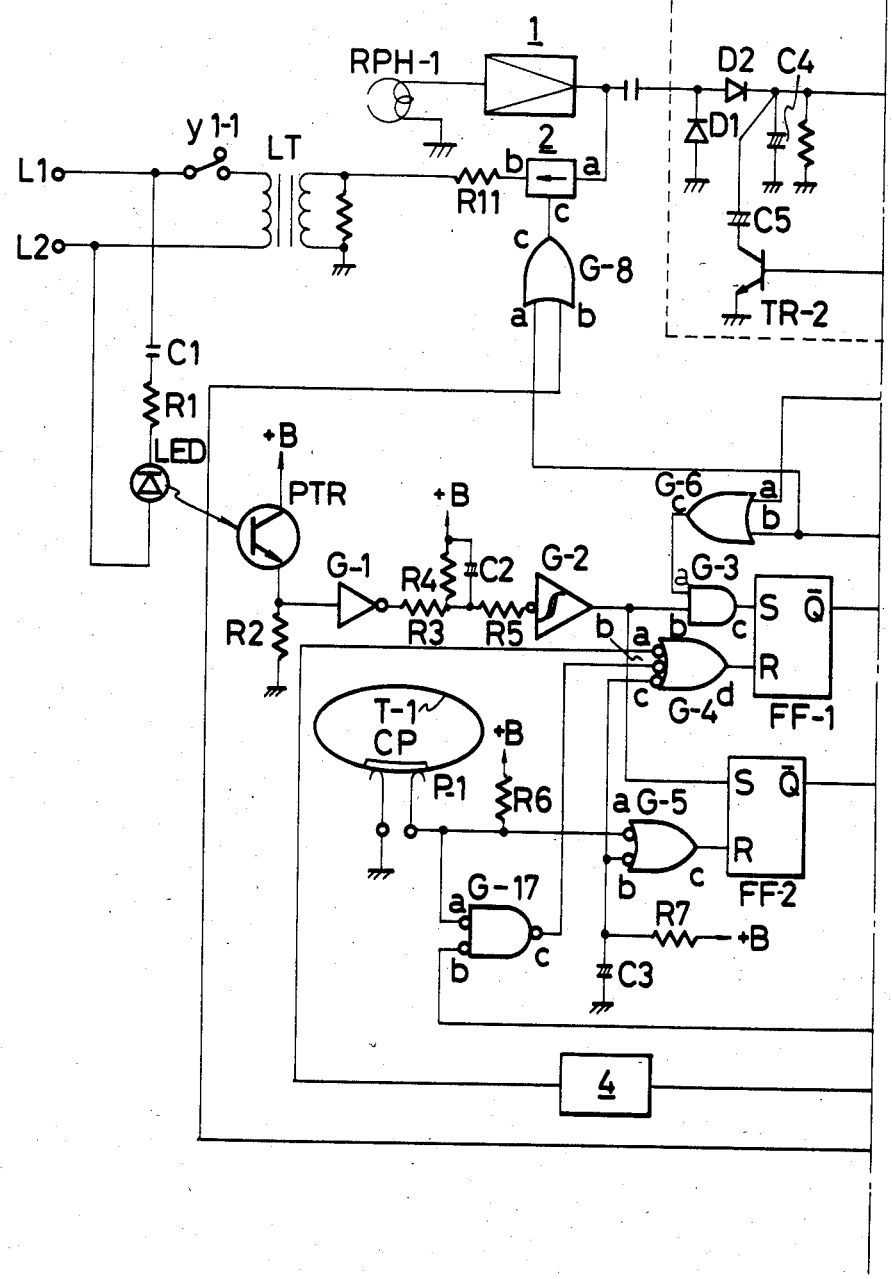
Figure 1B:
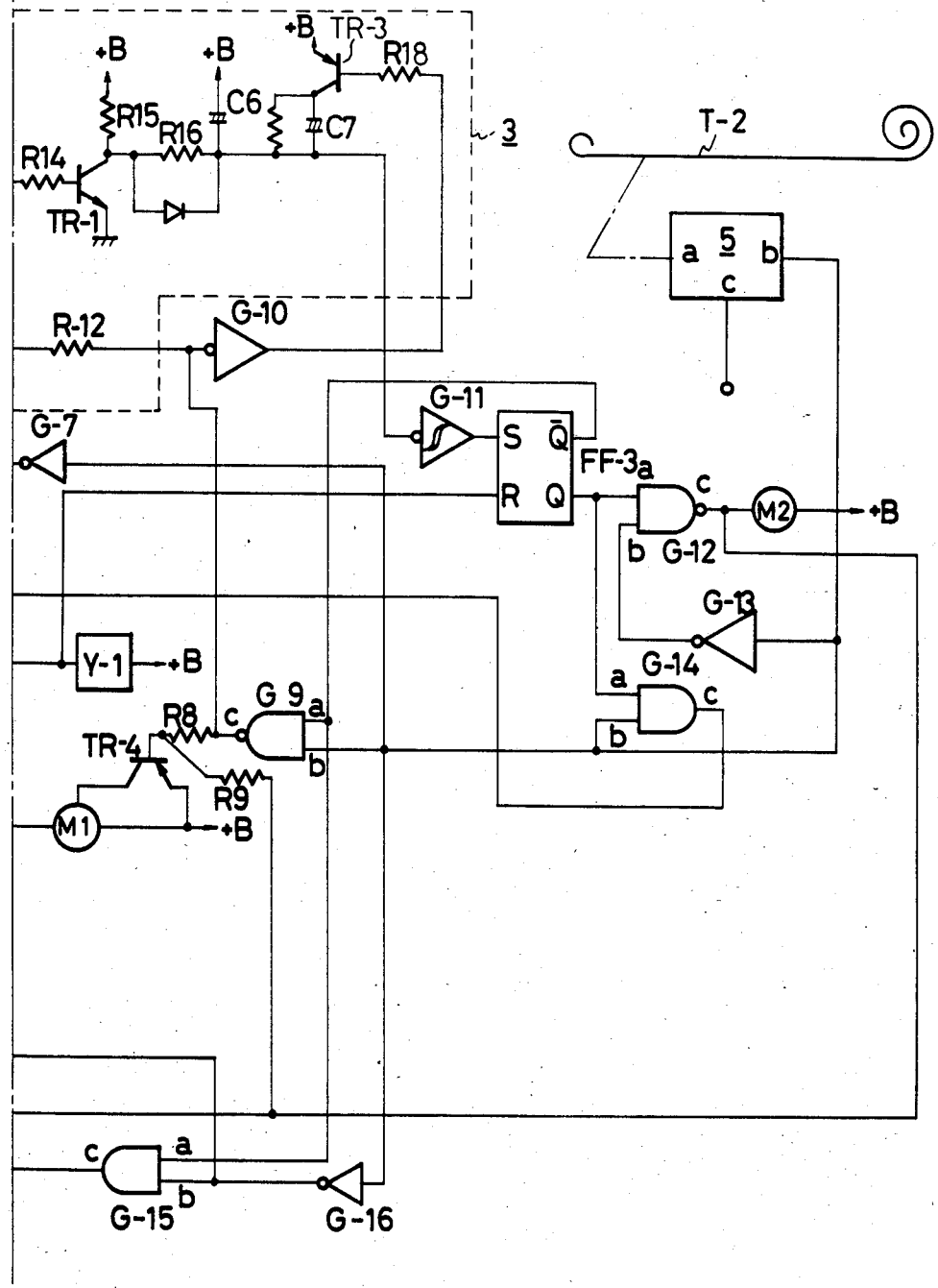

The drawing is a circuit diagram of an automatic telephone answering apparatus according to an embodiment of the present invention. Reference symbols L1 and L2 denote telephone lines, respectively; LT, a line transformer; LED, a light-emitting transistor which is turned on in response to a ringing signal; PTR, a phototransistor which is turned on when light is incident thereon from the light-emitting diode LED; C2, a capacitor charged by the ringing signal; and FF-1, a flip-flop which is set in response to the ringing signal. A relay Y-1 serves as a load of the flip-flop FF-1 and has a loop contact y1-1. Reference symbol FF-2 denotes a drive flip-flop which is set in response to the ringing signal so as to drive a motor M1. The motor M1 serves to drive an outgoing message tape T-1. The motor M1 has an arrangement for increasing the tape speed to about 10 times the previous speed when a transistor TR-4 is turned on and a governer of the motor M1 becomes short-circuited. Reference symbol RPH-1 denotes a record/play head of the outgoing message tape T-1. Reference numeral 1 denotes an amplifier; 2, an analog switch which is turned on so as to supply a reproduced sound (from the outgoing message tape T-1) from a terminal a to a terminal b when a terminal c is set at high level. Reference numeral 3 denotes a discriminator for discriminating the first and second messages from a mark (consisting of a continuous signal of 1,400 Hz for three seconds). The time constant of the discriminator 3 is switched by transistors TR-2 and TR-3. Reference symbol FF-3 denotes a flip-flop which is set upon detection of the mark. Reference symbol M2 denotes a motor which serves as a load of the flip-flop FF-3 to drive an incoming message tape T-2. Reference symbol 4 denotes a timer for presetting a travel time of the incoming message tape T-2; and 5, an end detector for generating a signal of high level from a terminal b thereof when the incoming message tape T-2 has reached its end or is damaged. Reference symbols G-1, G-7, G-10, G-13 and G-16 denote inverters, respectively; G-6 and G-8, OR gates, respectively; G-4 and G-5, NOR gates, respectively; G-3, G-14 and G-15, AND gates, respectively; G-9 and G12, NAND gates, respectively; and G-2 and G-11, Schmitt trigger circuits, respectively.

The operation of the automatic telephone answering apparatus having the configuration described above will now be described. A conductor tab P-1 is adhered to a beginning (a position identical to an end) of the outgoing message tape T-1. The first message for requesting the caller to record his voice is recorded at the beginning portion of the outgoing message tape T-1. For example, "This is Hashimoto Corporation. We are sorry nobody is here. Please leave your message after you hear the tone. We'll contact you as soon as possible. Thank you." may be recorded as the first message. The second message is recorded at a later portion of the outgoing message tape T-1. For example, "This is Hashimoto Corporation. We are sorry we are closed. Please call again tomorrow." may be recorded as the second message. Assume that the mark (continuous signal of 1,400 Hz for 3 seconds) is recorded between the first and second messages. Also assume that the tape is stopped by a known cue circuit (not shown) such that the conductor tab P-1 contacts an electrode CP or the conductor tap P-1 is slightly past the electrode CP. When the power switch of the automatic telephone answering apparatus is turned on, a time constant circuit of a capacitor C3 and a resistor R7 resets the flip-flops FF-1 and FF-2. The flip-flop FF-3 is reset through the flip-flop FF-1, so that the apparatus is set in the standby mode. Assume also that the incoming message tape T-2 has not reached its end. In this state, when a telephone call is received, the light-emitting diode LED is turned on in response to the ringing signal. When the LED is turned on, light is incident on the phototransistor PTR. A signal from the phototransistor PTR is supplied to the capacitor C2 through the inverter G-1 so as to charge the capacitor C2. The signal is further supplied to set the flip-flop FF-2 through the Schmitt trigger circuit G-2. As a result, the motor M1 is energized. As described above, since the incoming message tape T-2 has not reached its end, an output terminal b of the end detector 5 is set at L or low level, so that an output terminal b thereof is set at L level and a terminal c of the NAND gate G-9 is set at H level. The transistor TR-4 is then kept off, and the governer of the motor M1 will not be short-circuited in this state. The motor M1 is therefore driven at the normal speed. As a result, the outgoing message tape T-1 is started at the normal speed. At the same time, when a terminal b of the AND gate G-3 goes to H level through the Schmitt trigger circuit G-2, an output from the end detector 5 is supplied to a terminal a of the AND gate G-3 through the inverter G-7 and terminals a and c of the OR gate G-6, so that the terminal a of the AND gate G-3 goes to H level. The flip-flop FF-1 is set through a terminal c of the AND gate G-3, so that the relay Y-1 is energized so as to form a loop through the contact y1-1. As a result, the ringing tones are stopped. In this case, the outgoing message tape T-1 is played by the record/play head RPH-1 from the beginning at the normal speed. The reproduced signal is amplified by the amplifier 1 and appears at the terminal a of the analog switch 2. A signal of H level is supplied to the control terminal c of the analog switch 2. That is, a terminal a of the AND gate G-15 which receives an output from the $\overline{Q}$ terminal of the flip-flop FF-3 is set at H level. A terminal b of the AND gate G-15 receives a signal of H level which is obtained by inverting an output (L level) at an output terminal b of the end detector 5 through the inverter G-16, so that the output terminal c of the AND gate G-15 is set at H level. The control circuit c of the analog switch 2 receives the output of H level from the terminal c of the AND gate G-15 through terminals b and c of the OR gate G-8. As a result, the analog switch 2 is turned on. For this reason, the reproduced first message is sent onto the telephone line through the line transformer LT. The reproduced message signal is also supplied to the discriminator 3. The transistor TR-2 is triggered through a terminal c of the NAND gate G-9 and a resistor R12, so that a capacitor C5 is equivalently connected in parallel with a capacitor C4. The transistor TR-3 is triggered through the inverter G-10 and a resistor R18, so that a capacitor C7 is equivalently connected in parallel with a capacitor C6. Therefore, the reproduced message signal is rectified by diodes D1 and D2 and is smoothed by the capacitors C4 and C5. When the signal reproduced by the record/play head RPH-1 indicates voice data, the transistor TR-1 repeats the ON/OFF operation, and the capacitors C6 and C7 will thus not be charged. However, when the mark (e.g., 1,400 Hz) recorded immediately after the first message is reproduced, this signal has a predetermined amplitude, and the transistor TR-1 is kept ON. The capacitors C6 and C7 are charged in about one second through a resistor R16. The flip-flop FF-3 is set through the Schmitt trigger circuit G-11. When the flip-flop FF-3 is set, a terminal a of the NAND gate G-12 goes to H level. A terminal b of the NAND gate G-12 is set at H level through the inverter G-13. A terminal c of the NAND gate G-12 is thus set at L level, so that the motor M2 is energized so as to drive the incoming message tape T-2 at the normal speed. When the incoming message tape T-2 is started, the timer 4 is simultaneously started. At the same time, a terminal $\overline{Q}$ of the flip-flop FF-3 is set at L level, and then the analog switch 2 is turned off through the AND gate G-15. As a result, the second message of the outgoing message tape T-1 will not be sent onto the telephone line. When the incoming message tape T-2 is started in this manner, the automatic telephone answering apparatus is set in the recording mode so as to record the callers message on the incoming message tape T-2. The arrangement and operation in the recording mode are well known to those who are skilled in the art, and a detailed description thereof will be omitted. When the incoming message tape T-2 is started, the transistor TR-4 is simultaneously turned on through a resistor R9. As will have been apparent from the previous description, the outgoing message tape T-1 is fast forwarded. When the conductor tab P-1 is brought into contact with the electrode CP, the flip-flop FF-2 is reset through terminals a and c of the NOR gate G-5 so as to deenergize the motor M1. As a result, the outgoing message tape T-1 is stopped. When a predetermined time preset in the timer 4 has elapsed, the flip-flop FF-1 is reset through terminals a and d of the NOR gate G-4, so that the relay Y-1 is turned off to open the loop. At the same time, the flip-flop FF-3 is reset upon resetting of the flip-flop FF-1, and the motor M2 is deenergized. As a result, the incoming message tape T-2 is stopped, and the automatic telephone answering apparatus is set in the standby mode. The above operation is repeated when each subsequent telephone call is received. However, when the incoming message tape T-2 has reached its end or is damaged, an output of H level appears at the terminal b of the end detector 5. When a telephone call is received under this condition, the flip-flop FF-2 is set through the Schmitt trigger circuit G-2 in response to the ringing signal as previously described. The motor M1 is then energized. When the terminal b of the end detector 5 is set at H level, both terminals a and b of the NAND gate G-9 are set at H level, so that a terminal c thereof is set at L level. The transistor TR-4 is then turned on through a resistor R8. The motor M1 is driven at a high speed to fast forward the outgoing message tape T-1.

However, when the terminal b of the end detector 5 is set at H level, the terminal a of the AND gate G-3 is set at L level through the inverter G-7 and the terminals a and c of the OR gate G-6. The flip-flop FF-1 may not be set in response to the ringing signal, and no loop is formed. As a result, the tape is fast forwarded, during which no sound is produced. In this manner when the first half of the tape is fast forwarded and the specific signals are reproduced in the fast forward mode, the capacitors C5 and C7 are disconnected since the transistors TR-2 and TR-3 are kept OFF, thus providing a small time constant. The mark may be clearly discriminated from the voice signal in the fast forward mode, so the flip-flop FF-3 can be set. However, in this case, the signal of L level obtained by inverting the signal of H level at the terminal b of the end detector 5 through the inverter G-13 is supplied to the terminal b of the NAND gate G-12. As a result, the motor M2 is not driven. On the other hand, the signal of H level at the output terminal Q of the flip-flop FF-3 and the signal of H level at the terminal b of the end detector 5 are supplied to the input terminals a and b of the AND gate G-14, respectively, and an output terminal c of the AND gate G-14 is thus set at H level, so that the signal of H level is supplied to the terminal a of the AND gate G-3 through the terminals b and c of the OR gate G-6. The signal of H level from the Schmitt circuit G-2 produced in response to the ringing signal is supplied to the input terminal b of the AND gate G-3. A signal of H level appears at the output terminal c of the AND gate G-3, and the flip-flop FF-1 is set. The relay Y-1 is energized to form a loop, so that the ringing tones are stopped. However, when the flip-flop FF-3 is set, the signal of L level at the terminal $\overline{Q}$ of the flip-flop FF-3 is supplied to turn off the transistor TR-4 through the NAND gate G-9. The speed of the outgoing message tape T-1 is changed from the fast speed to the normal speed, and the second message is given to the caller. When the second message has been completely reproduced and the conductor tab P-1 contacts the electrode CP, the flip-flop FF-2 is reset through the terminals a and c of the NOR gate G-5. The flip-flop FF-1 is reset through the terminals b and d of the NOR gate G-4. The flip-flop FF-3 is reset upon resetting of the flip-flop FF-1, so that the automatic telephone answering apparatus is returned to the standby mode. The response-only operation is performed again each time a subsequent telephone call is received. In order to release this, the end detector 5 must be reset manually or by a remote control unit (not shown).

What is claimed is:

1. An automatic telephone answering apparatus responsive to a telephone call from a caller, wherein there is provided an outgoing message tape on which response messages are recorded such that a first message, a mark and a second message are recorded respectively in beginning, middle and end portions of the outgoing message tape; means for detecting an incoming message tape condition; discriminating means for detecting said mark; means operative during a normal telephone operation upon reception of a call for reproducing only said first message to the caller and fast forwarding said second message in a silent mode in response to said mark detected by said discriminating means so as to search a beginning of said first message; and means responsive to said memory tape condition detecting means and operative when an incoming message tape has reached an end thereof or is damaged for reproducing only said second message to the caller upon reception of a telephone call after said first message is fast forwarded in the silent mode and thereafter returning tape speed to a normal speed and setting said apparatus in a standby state.

2. An apparatus according to claim 1, wherein said discriminating means has variable time constant changing means for detecting said mark in the fast forward mode.

3. An automatic telephone answering apparatus responsive to a telephone call from a caller, comprising:
an incoming message tape;
an outgoing message tape on which is recorded a response message having, in series, a first message, a mark and a second message;
means responsive to an incoming call for reproducing only the first message to the caller;
first means for detecting the beginning of said first message and said mark recorded on said tape;
means responsive to said first detecting means for advancing said outgoing message tape through said second message on said tape to the beginning of said first message in said tape;
second means for detecting an end of or damage to the incoming message tape; and
means responsive to said second detecting means for advancing the outgoing message tape through the first message on the tape for reproducing only the second message to the caller.

4. The apparatus of claim 3, said advancing means including means for fast forwarding said tape, said apparatus further comprising means for muting reproduction of messages recorded on said tape and means for operating said muting means while said tape is being fast forwarded.

5. An apparatus according to claim 3 including means for fast-forwarding the outgoing message tape through the first message or through the second message selectively to transmit the second message or the first message respectively.

6. An automatic telephone answering apparatus, comprising means for detecting a condition of an incoming message tape, means for selectively transmitting only one of a first message or a second message from an outgoing message tape in response to an incoming call in response to said detecting means according to whether the incoming message tape is in a condition to record an incoming message, and means for detecting the start of the first message and/or the end of the second message for advancing the outgoing message tape through the non-transmitted second or first message respectively and stopping the outgoing message tape at the start of the first message and/or the end of the second message.

7. An apparatus according to claim 6 wherein the mark is a tone on the outgoing message tape of such frequency and duration, as recorded on the tape, as to be detectable both at a normal speed and at a fast forward speed, the apparatus including a mark detector circuit adopted to detect the mark at both speeds.

8. An apparatus according to claim 6 wherein the outgoing message tape and incoming message tape are endless.

9. An apparatus according to claim 6, wherein the outgoing message tape and incoming message tape are two-ended.

* * * * *